United States Patent [19]

Delot

[11] Patent Number: 5,333,646
[45] Date of Patent: Aug. 2, 1994

[54] ELECTROMAGNETIC VALVE FOR CONTROLLING THE FLOW OF A FLUID IN A PIPE

[75] Inventor: Jose Delot, Sens, France

[73] Assignee: Delot Process, S.A., Trappes Cedex, France

[21] Appl. No.: 776,369

[22] PCT Filed: May 31, 1990

[86] PCT No.: PCT/FR90/00380

§ 371 Date: Jan. 29, 1992

§ 102(e) Date: Jan. 29, 1992

[87] PCT Pub. No.: WO90/15279

PCT Pub. Date: Dec. 13, 1990

[30] Foreign Application Priority Data

Jun. 2, 1989 [FR] France ............... 89 07296

[51] Int. Cl.$^5$ ............................. F15C 1/04
[52] U.S. Cl. ..................... 137/827; 137/13; 222/590
[58] Field of Search ............ 137/827, 13; 222/590

[56] References Cited

U.S. PATENT DOCUMENTS

| | | |
|---|---|---|
| 2,834,692 | 3/1955 | Tama . |
| 3,626,964 | 12/1971 | Van Fossen . |
| 3,701,357 | 10/1972 | Granström et al. ............ 137/827 |
| 3,939,799 | 2/1976 | Kanbara et al. . |
| 3,970,112 | 7/1976 | Bernard . |
| 4,082,207 | 4/1978 | Garnier et al. . |
| 4,169,426 | 10/1979 | Kornmann et al. . |
| 4,171,707 | 10/1979 | Branover . |
| 4,324,266 | 4/1982 | Garnier et al. . |
| 4,655,327 | 4/1987 | Gloor et al. ............. 137/827 |
| 4,904,497 | 2/1990 | Lewis . |
| 4,947,895 | 8/1990 | Lillicrap . |

FOREIGN PATENT DOCUMENTS

| | | |
|---|---|---|
| 1225361 | 8/1987 | Canada . |
| 859241 | 12/1952 | Fed. Rep. of Germany . |
| 1037789 | 8/1958 | Fed. Rep. of Germany . |
| 1157047 | 11/1963 | Fed. Rep. of Germany . |
| 2239309 | 2/1974 | Fed. Rep. of Germany . |
| 2733075 | 4/1978 | Fed. Rep. of Germany . |
| 1457615 | 9/1966 | France . |
| 2237975 | 2/1975 | France . |
| 2318239 | 2/1977 | France . |
| 2323772 | 4/1977 | France . |
| 2647874 | 12/1990 | France . |
| 51-20334 | 6/1976 | Japan . |
| 61-235549 | 10/1986 | Japan . |
| 1-136954 | 5/1989 | Japan . |
| 630617 | 10/1978 | U.S.S.R. . |
| 716768 | 2/1980 | U.S.S.R. . |
| 777213 | 6/1957 | United Kingdom . |
| 1299848 | 12/1972 | United Kingdom . |
| 1308087 | 2/1973 | United Kingdom . |

Primary Examiner—A. Michael Chambers
Attorney, Agent, or Firm—Sandler, Greenblum & Bernstein

[57] ABSTRACT

Electromagnetic valve for controlling the flow of a liquid metal or metal alloy in a pressurized pipe is provided with a tubular body made of a material which is permeable to magnetic fields, and a polyphase field coil arranged around the tubular body in order to create a magnetic field for sliding lengthwise along the tubular body. A core is held in an axial position through the tubular body, with the core leaving between itself and the inner surface of the tubular body a substantially annular passage for the liquid metal or metal alloy of which the flow is to be controlled.

17 Claims, 1 Drawing Sheet

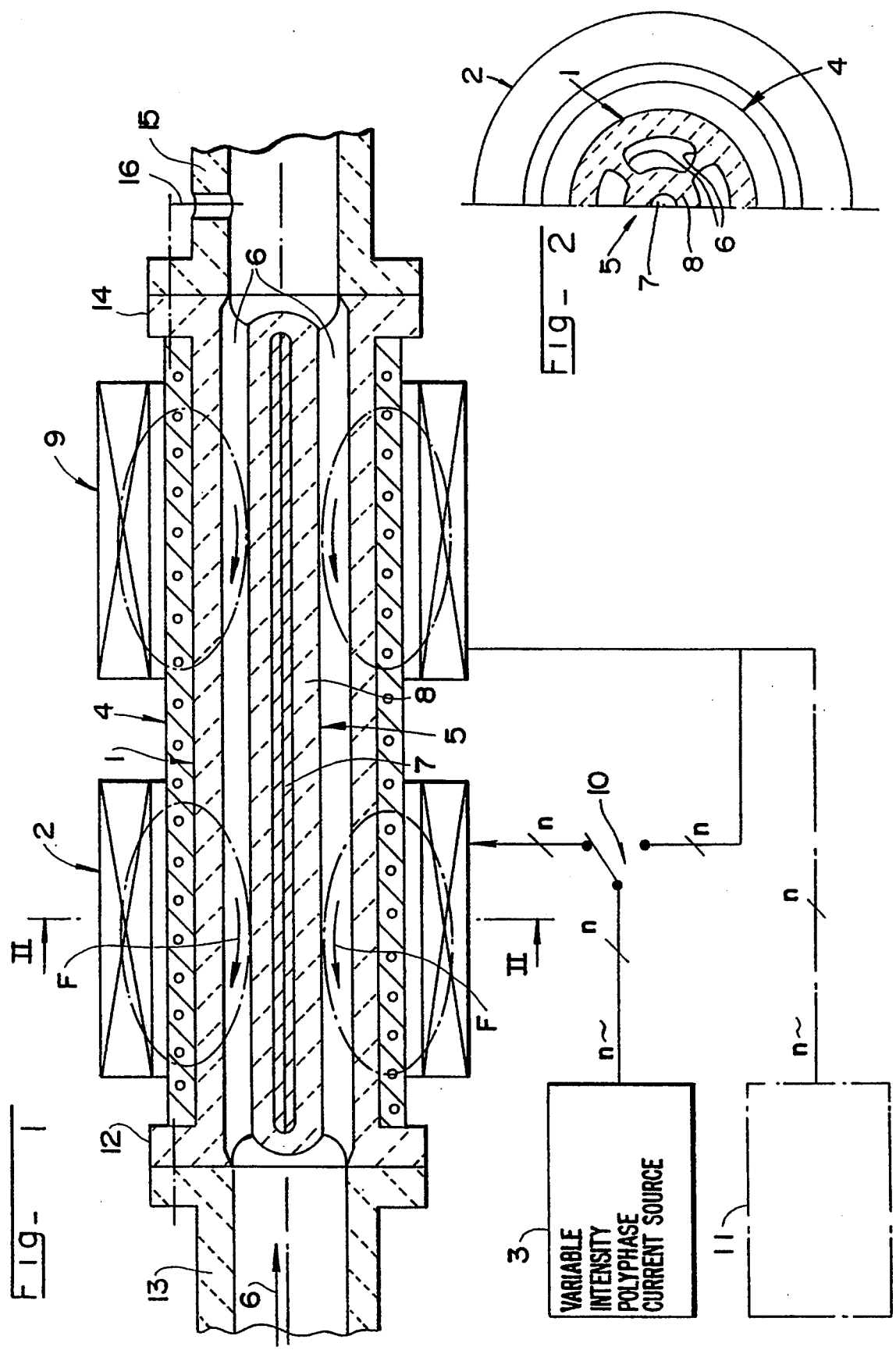

ELECTROMAGNETIC VALVE FOR CONTROLLING THE FLOW OF A FLUID IN A PIPE

BACKGROUND OF THE INVENTION

1. Field of the Invention

The present invention relates to an electromagnetic valve for controlling the flow of a metal or metal alloy in liquid phase in a pipe under load, comprising a tubular body made of a material permeable to the magnetic field and at least one polyphase field coil arranged around the tubular body in order to create a magnetic field sliding lengthwise along the tubular body.

2. Discussion of Background Information

In the field of metallurgy, for example, in an industrial casting equipment or in equipment for covering iron and steel products with a coating of metal or metal alloy, such as hot galvanization equipment, or in other applications, it is often necessary to be able to control a flow of metal or metal alloy in liquid phase. In this respect, either the metal or the metal alloy is in molten state following a controlled increase of its temperature, or the metal or metal alloy is normally liquid at ambient temperature which is the case, for example with mercury. In order to control a flow of liquid metal or metal alloy, it is usual to use electromechanical or hydromechanical systems such as nozzles with slide valve, stopper rods, etc. These systems involve considerable investment and relatively high maintenance costs due to the presence of movable mechanical elements in these systems.

It is for this reason that electromagnetic valves have been proposed for some time which do not comprise any movable mechanical elements for controlling the flow of a metal or metal alloy in liquid phase in a pipe under load. The electromagnetic valves of his patent operate in accordance with a principle similar to that of a linear motor. The role of the mobile armature is performed by the metal or metal alloy whose flow is to be controlled. In these electromagnetic valves, the polyphase field coil is disposed and electrically connected so that the magnetic field that it generates propagates in counter-flow with respect to the normal flow direction of the liquid metal or metal alloy in the pipe under load. In other words, the magnetomotive force generated by the polyphase field coil and applied to the liquid metal in the pipe opposes the force due to the hydrostatic pressure of the liquid metal in the pipe. By adjusting the intensity of the current in the polyphase coil, it is possible to regulate the flow rate of the liquid metal or metal alloy in the pipe. The greater is the intensity of the current in the polyphase coil, the lower the flow rate of the liquid metal or metal alloy flowing through the electromagnetic valve. Theoretically, by using a sufficiently intense current, it is possible to stop the flow of the liquid metal or metal alloy arriving at the valve. However, the intensity of the current necessary for stopping the flow of metal liquid or metal alloy is relatively great. Therefore, because the electrical power necessary for maintaining the electromagnetic valve in the "closed" state is great, it has proved difficult to obtain a complete reliable stop of the flow of liquid metal or metal alloy.

In order to obtain a complete stoppage of the flow of liquid metal or metal alloy, it has been proposed to partially close the outlet end of the tubular body of the electromagnetic valve by a transverse wall presenting an outlet orifice offset or off-center with respect to the longitudinal axis of the tubular body. Although such an arrangement effectively insures complete stop of the flow of liquid metal or metal alloy, the intensity of the current necessary for that purpose remains relatively high. In addition, when the electromagnetic valve is "opened", the transverse wall with its off-center outlet orifice causes disturbances (turbulence) and pressure drops in the flow of liquid metal or metal alloy which, in certain applications, may be unacceptable.

SUMMARY OF THE INVENTION

The object of this invention is therefore to provide an electromagnetic valve which requires less electrical power than the heretofore known electromagnetic valve for controlling and stopping the flow of a liquid metal or metal alloy in a pipe under load, and which introduces only slight disturbances in the flow when the valve is opened.

For this purpose, according to the present invention, the electromagnetic valve for controlling the flow of a metal or metal alloy in liquid phase in a pipe under load comprises a tubular body made of a material permeable to the magnetic field and at least one polyphase field coil arranged around the tubular body to create a magnetic field sliding along the longitudinal axis of the same tubular body. The valve comprises a core which is maintained and extends axially in the tubular body, the said core forms, between it and the inner wall of the tubular body, a substantially annular passage for the liquid metal or metal alloy whose flow is to be controlled.

According to a preferred embodiment of this invention, the core can be formed by a magnetic bar embedded in a mass of material permeable to the magnetic field, with the core being connected to the tubular body of the valve by radial arms made from the same material.

Although the reasons why the electromagnetic valve of this invention is more efficient than the previously known electromagnetic valve are not fully elucidated, without wishing to be bound to any particular theory, it may be due to the fact that the magnetic flux generated by the field coil is concentrated by the core provided in the tubular body, and the flow of liquid metal or metal alloy is confined in the annular region between the core and the internal wall of the tubular body i.e., in a region where the magnetic field is naturally more intense. Therefore, the magnetic field is more efficient at the annular region than at the center of the tubular conduit, because the annular region is closer to the field coil which surrounds the tubular body.

BRIEF DESCRIPTION OF THE DRAWING

A non-limiting embodiment of the invention will be described with reference to the attached drawings, in which:

FIG. 1 is a schematic cutaway view of an electromagnetic valve in accordance with the invention.

FIG. 2 is a half cutaway view along line II—II of FIG. 1. The electromagnetic valve shown in FIGS. 1 and 2 comprises, in a known manner, a tubular body 1 made of a material which is permeable to the magnetic field created by a polyphase field coil 2 which surrounds the tubular body 1, and which may be supplied with current by a source of polyphase current 3 with variable intensity.

DETAILED DESCRIPTION OF THE PREFERRED EMBODIMENTS

If the electromagnetic valve is intended to control a flow of molten metal or metal alloy, the body 1 is preferably made of a refractory material which is non-wettable by contact with the molten metal or metal alloy, for example, a ceramic material.

In addition, in such an embodiment, the tubular body is preferably closely surrounded over its whole length by a heating device 4 capable of heating the body 1 to a sufficient temperature to maintain the molten metal or metal alloy at a predetermined temperature higher than its melting temperature. The heating device 4 may be composed in a known way, for example, of an electromagnetic induction heating device or by electrical heating resistors.

On the other hand, if the metal or metal alloy is liquid at low temperature or ambient temperature, the body 1 does not need to be of a refractory material and may simply be made of a material permeable to the magnetic field, which is stiff enough to ensure the mechanical strength of the valve body and compatible with the metal or a metal alloy passing through the valve.

The polyphase field coil 2 is placed and connected electrically so as to create a field sliding along the longitudinal axis of the tubular body 1 in a direction such that the magnetomotive forces F exerted by the polyphase field coil 2 on the liquid metal or metal alloy flowing through the tubular body 1 oppose the flow of the liquid metal or metal alloy, shown by the arrow G under the effect of the hydrostatic pressure. The polyphase field coil 2 can, for example, be composed of a coil of the type manufactured by the MADYLAM Laboratoire at Saint-Martin-d'Heres, France. If necessary, this field can be cooled in a known manner by a cooling fluid circulating in channels provided in the coil. The current necessary for exciting the polyphase coil 2 provided by the source 3 can be obtained, for example, from the 3-phase network 380 V-50 Hz connected to a voltage lowering transformer capable of lowering the voltage to 17 V and itself coupled to the field coil 2 by means of an intensity regulating device.

In accordance with the invention, a core 5 extends axially in the tubular body 1 and is held therein by several radial arms or flanges 6. The core 5 may have approximately the same length as the tubular body 1 and the arms or flanges 6 may have the same length as the core 5 or extend only over a part of its length. Preferably, the core 5 and flanges 6 are profiled so as to generate the least possible disturbances in the liquid metal or alloy flowing in the tubular body 1. For the same reasons, the inner diameter of the tubular body 1 and the outer diameter of the core 5 are chosen in such a way that the area of the annular section of passage between the core 5 and the body 1 is equal to the area of the circular section of the passage upstream and possibly downstream of the electromagnetic valve. Preferably, the core 5 is composed of a magnetic bar 7 embedded in a mass 8 of material permeable to the magnetic field, this material being preferably the same as that forming the arm or flanges 6 and the tubular body 1, for example, a refractory material non-wettable in contact with the liquid metal or metal alloy. The magnetic bar 7 ensures the looping of the magnetic field generated by the polyphase field coil 2.

In the embodiment shown as an example in FIG. 1, the electromagnetic valve may include a second polyphase field coil 9 arranged and connected electrically so as to be able to play a role similar to that of the polyphase field coil 2. The polyphase field coil 9 can be connected to the current source 3, for example, by means of a switch 10, or it can be connected to its own adjustable polyphase current source 11, as shown in broken lines in FIG. 1. In the first case, the polyphase field coil 9 doubly ensures the same function as the polyphase field coil 2 and can be used as an emergency coil in the event of failure of coil 2. In the second case, a small leakage flow may possibly be allowed at the level of the polyphase field coil 2, which small flow might then easily be stopped by the magnetic field created by the polyphase field coil 9. The advantage of this second arrangement is to further reduce the consumption of energy necessary for completely stopping the flow of liquid metal or metal alloy and to limit the size of the equipment necessary for supplying current to field coils 2 and 9.

At its inlet end, the tubular body 1 is equipped with a flange or other connecting means 12 by which the electromagnetic valve may be fixed to the end of a pipe 13 for conveying liquid metal or metal alloy or to a vessel containing the liquid metal or metal alloy. In the same way, at its outlet end, the tubular body 1 may also include a flange or other appropriate connecting means 14 by which the electromagnetic valve may be connected, if required, to another pipe 15 for transporting liquid metal or metal alloy.

If the electromagnetic valve is intended to control the flow of a molten metal or metal alloy, the tubular body 1 or the pipe 15 may advantageously be equipped with an injector 16 allowing a controlled injection of a neutral or inert gas avoiding oxidation of the liquid metal or metal alloy trapped in the electromagnetic valve.

By way of example, with an electromagnetic valve whose body 1 has an inner diameter of 14 mm and a core 5 with an outer diameter of 8 mm and comprising a sole polyphase field coil having 10 turns per phase with a diameter of 45 mm, it was possible to completely stop the flow of a molten zinc alloy, which was maintained at a temperature of 480° C., the hydrostatic pressure at the inlet to the electromagnetic valve being $2.5 \times 10^4$ Pa (0.25 bar). For that purpose, the polyphase field coil was supplied with a current of 2400 A. (It should be noted that the assembly with which the experiment was carried out was not optimized and did not include a device for regulating intensity. It may therefore be expected that the intensity of the current sufficient for causing the complete of the flow of molten zinc can be even lower than 2400 A). By way of comparison, with an electromagnetic valve with no central core, in order to stop almost completely stop the flow of molten zinc alloy, it would have been necessary to supply the field coil with a polyphase current of an intensity at least four to five times greater.

It goes without saying that the form of execution of the electromagnetic valve described above has been given purely as an example and is by no means limitative, and that many modifications can easily be made by specialists without departing from the scope of this invention.

I claim:

1. An electromagnetic valve for controlling flow of a liquid metal or metal alloy in a pipe under load, comprising:

a tubular body composed of a material permeable to a magnetic field, said tubular body having a longitudinal axis and an internal wall;

at least one polyphase field coil positioned around said tubular body capable of generating a magnetic field which is slidable along said longitudinal axis; and a core comprising a magnetic material, said core extending axially within said tubular body to ensure looping of the magnetic field generated by said at least one polyphase field coil and defining a substantially annular passage with said internal wall for flow of the liquid metal or metal alloy.

2. The electromagnetic valve according to claim 1, wherein said core comprises a magnetic bar embedded in a mass of material permeable to the magnetic field.

3. The electromagnetic valve according to claim 2, comprising radial arms for positioning said core with respect to said internal wall.

4. The electromagnetic valve according to claim 3, wherein said radial arms are composed of material permeable to the magnetic field.

5. The electromagnetic valve according to claim 4, wherein said radial arms and said mass of material are composed of the same material.

6. The electromagnetic valve according to claim 1, wherein said at least one polyphase coil comprises two polyphase field coils positioned around said tubular body.

7. The electromagnetic valve according to claim 6, wherein said two polyphase field coils are connected to a same source of current.

8. The electromagnetic valve according to claim 6, wherein said two polyphase field coils are connected to different sources of current.

9. The electromagnetic valve according to claim 1, wherein said tubular body comprises a refractory material.

10. The electromagnetic valve according to claim 9, wherein said refractory material comprises a ceramic material.

11. The electromagnetic valve according to claim 1, wherein said core and said tubular body comprise substantially equal lengths.

12. The electromagnetic valve according to claim 11, wherein said core comprises a magnetic bar embedded in a mass of material permeable to the magnetic field.

13. The electromagnetic valve according to claim 12, comprising radial arms for positioning said core with respect to said internal wall.

14. The electromagnetic valve according to claim 1, further comprising a heating element for heating said tubular body.

15. The electromagnetic valve according to claim 1, further comprising an injector element for controlled injection of an inert gas into the electromagnetic valve while avoiding oxidation of the liquid metal or metal alloy.

16. The electromagnetic valve according to claim 14, wherein said core comprises a magnetic bar embedded in a mass of material permeable to the magnetic field.

17. The electromagnetic valve according to claim 16, comprising radial arms for positioning said core with respect to said internal wall.

* * * * *

UNITED STATES PATENT AND TRADEMARK OFFICE
CERTIFICATE OF CORRECTION

PATENT NO. : 5,333,646
DATED : August 2, 1994
INVENTOR(S) : Jose DELOT

It is certified that error appears in the above-indentified patent and that said Letters Patent is hereby corrected as shown below:

At column 1, line 33, insert ---, namely, in DE-B1 037 789--- after "reason".
At column 1, line 37, change "his" to ---this---.
At column 2, line 27, insert ---made of a magnetic material--- after "core".
At column 2, line 28, insert ---to ensure the looping of the magnetic field generated by the polyphase field coil--- after "body".
At column 2, line 29, change "said core" to ---core---.
At column 2, line 62, begin a new paragraph with ---The electromagnetic valve shown..."
At column 2, between lines 62 and 63, insert ---DETAILED DESCRIPTION OF THE PREFERRED EMBODIMENTS---.
At column 4, line 54, change "completely stop" to ---completely---.
At column 4, lines 59-64, delete "It goes without saying that the form of execution of the electromagnetic valve described above has been given purely as an example and is by no means limitative, and that many modifications can easily be made by specialists without departing from the scope of this invention."

Signed and Sealed this

Twenty-eight Day of March, 1995

Attest:

BRUCE LEHMAN

*Attesting Officer*   Commissioner of Patents and Trademarks